UNITED STATES PATENT OFFICE.

HILBERT L. FALK, OF NEW ORLEANS, LOUISIANA, ASSIGNOR TO LYNDON D. WOOD, OF PHILADELPHIA, PENNSYLVANIA.

COMPOSITION FOR COATING METALS FOR THE PURPOSE OF PERMITTING ELECTRIC CURRENTS TO OPERATE BY THE ACTION OF LIGHT.

1,424,088.  Specification of Letters Patent.  Patented July 25, 1922.

No Drawing.   Application filed December 10, 1921.   Serial No. 521,477.

*To all whom it may concern:*

Be it known that I, HILBERT L. FALK, a citizen of the United States, residing at New Orleans, in the parish of Orleans and State of Louisiana, have invented new and useful Improvements in Composition for Coating Metals for the Purpose of Permitting Electric Currents to Operate by the Action of Light, of which the following is a specification.

This invention relates to compositions for coating surfaces whereby said surfaces under the action of light are rendered sensitive to electric currents and it has more particular reference to a process for making a sensitive compound for use in the reproduction of sound waves which have previously been photographed on films or plates. The object of this invention is the production of a composition of the nature hereinbefore referred to which when applied to a surface capable of conducting electric currents renders same usable for the reproduction of sound waves by the action of a ray of light.

My composition consists essentially of a mixture of platinum-barium-cyanide of potassium crystals, crude sulphur, tungstate of soda, calcium chloride, and selenium crystals.

In preparing the composition I prefer to use the ingredients in approximately the following proportions, namely:—

Platinum-barium-cyanide of potassium
  crystals_____10 parts
Crude sulphur_____20 parts
Tungstate of soda_____ 5 parts
Calcium chloride_____25 parts
Selenium crystals_____40 parts Good results however are obtained when the respective proportions of the ingredients are slightly varied.

The foregoing mentioned ingredients are thoroughly mixed and placed in an electric furnace and heated to a temperature of approximately 2200 degrees Fahrenheit, at which temperature the composition should be retained for approximately 50 minutes when said molten mixture is cooled and crystallized by dropping the melted mass into a container of water at substantially 40 degrees Fahrenheit. The resultant composition when coated upon an electric conducting wire or any other appropriate surface is sensitive to light rays and will permit the passage of electric current—when so exposed to light—void of violet rays.

The crystallized sensitive composition composed and prepared as above set forth is preferably used in connection with a platinum wire wound on a porcelain base and covered by a mica insulation. In applying the composition the insulation on the wire is firstly removed and the composition above set forth applied thereto in any of the well known ways after preferably subjecting it to a heat sufficient to cause liquification to some extent. The coated wire should then be permitted to cool when there is produced what may be termed a sensitive light cell or in other words, an element is produced by which the reproduction of sound waves preferably photographed on a film or plate can be accurately reproduced.

Having described my invention, what I claim as new and desire to secure by Letters Patent is:

1. A composition for coating surfaces for the purpose of permitting electric currents to operate by the action of light comprising a mixture of platinum-barium-cyanide of potassium crystals, crude sulphur, tungstate of soda, calcium chloride, and selenium crystals.

2. A sensitive compound for use in the reproduction of sound waves which have been photographed on films or plates comprising 10 parts of platinum-barium-cyanide of potassium crystals, 20 parts of crude sulphur, 5 parts of tungstate of soda, 25 parts of calcium chloride, 40 parts of selenium crystals.

3. The process of producing a sensitive compound for use in the reproduction of sound waves which have been photographed on films or plates consisting in heating a mixture of platinum-barium-cyanide of potassium crystals, crude sulphur, tungstate of soda, calcium chloride and selenium crystals to a temperature of approximately 2200 degrees Fahrenheit, maintaining said molten mixture at the stated temperature for a period of approximately 50 minutes, and then crystallizing the same by dropping the molten mass into water at a temperature of 40 degrees Fahrenheit.

In testimony whereof I affix my signature.

HILBERT L. FALK.